No. 884,085. PATENTED APR. 7, 1908.
F. GENGE.
EGG WHIP.
APPLICATION FILED JULY 3, 1907.
FIG. 1.
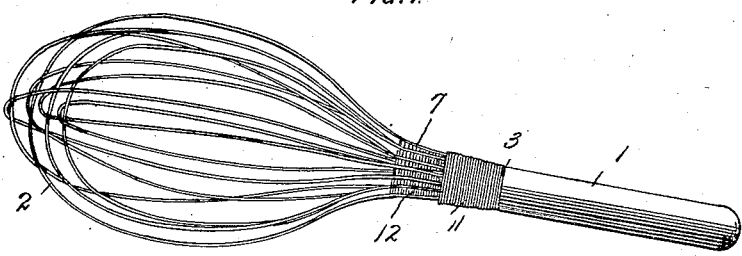
FIG. 2.
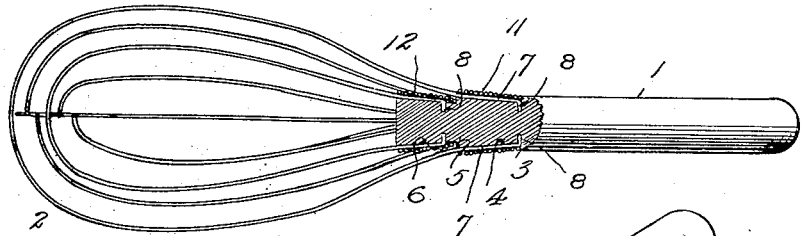
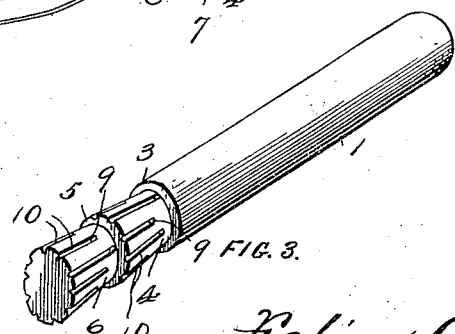
FIG. 3.
WITNESSES:
C. K. Davis
M. E. Moore
INVENTOR
Felix Genge
BY
Moore
Attorney

UNITED STATES PATENT OFFICE.

FELIX GENGE, OF EVERETT, WASHINGTON.

EGG-WHIP.

No. 884,085.

Specification of Letters Patent.

Patented April 7, 1908.

Application filed July 3, 1907. Serial No. 382,034.

*To all whom it may concern:*

Be it known that I, FELIX GENGE, a citizen of United States, residing at Everett, in the county of Snohomish and State of Washington, have invented certain new and useful Improvements in Egg-Whips, of which the following is a specification.

My invention relates to improvements in egg whips, and has for its object, the provision of an egg beater of simple, light and durable construction, which will serve for many useful purposes in the art of bakery and confectionery, and which will be practical and efficient in every particular.

With these and other objects in view, my invention comprises a suitable handle having a reduced shouldered end, wire loops having straight shank portions engaged on the reduced end of the handle, and binding means for securing the loops on the handle.

My invention further consists of an egg whip embodying certain other novel features of construction, combination and arrangement of parts substantially as disclosed herein and as illustrated in the accompanying drawings, in which:

Figure 1, is a perspective view of my improved egg whip. Fig. 2, is a longitudinal sectional view of the same. Fig. 3, is a detail view of the reduced end of the handle to which the wire loops are secured.

In the drawings: the numeral 1, designates the handle of the device, preferably of wood and of convenient size and shape, and 2, indicates the wire loops which form the beater proper and are of ovoid form. At some distance inward from one end of the handle, is formed a shoulder 3, and the handle is reduced in diameter from the shoulder outward. Instead of being cylindrical, it is preferable to form this reduced portion of the handle on an outward flare increasing in diameter toward the end of the handle, as shown at 4. A second shoulder 5, is formed nearer the end of the handle, and the end of the handle is thus still further reduced in diameter as shown at 6, the extreme reduced end of the handle preferably being flared outward as in the case of the first shouldered portion just described.

The wire loops are each formed with straight shank ends 7, terminating in extreme inturned angular ends 8, the angular ends of the loops adapted to be received in openings 9, formed in the reduced portions of the handle, while the shanks of the loops are received in the grooves 10, so that the shanks are thus partially embedded in the handle and lie practically flush with the surface of the handle. The openings in the reduced portions of the handle are arranged on different levels in staggered series as shown, and the loops are graduated in size so as to lie one within the other the ends of the respective loops being only in light contact if touching at all. After the first series of loops forming the inner series of the whip have been inserted in the respective openings and placed in position on the extreme reduced end of the handle, a coil of wire 12, is wrapped about the shanks, thus binding the loops upon the handle, the inturned ends of the loops preventing them from becoming loose and disengaged from the handle. The outer series of loops are then placed in position, the shanks and hooked ends engaging the respective grooves and openings in the larger reduced portion of the handle, and an outer wrapping of wire 11, is then placed about the shanks of this last series of loops. The loops are thus tied to the handle in two separate series, an inner and outer series.

Instead of the wrappings of wire, a ferrule or other fastening means may be employed, but the use of the wire is preferred, since it ties the shanks more firmly. The wire loops are made of some spring metal such as steel or brass and are preferably nickel plated, and the binding wire is also preferably nickel plated, so that the device is thoroughly sanitary.

From the foregoing description taken in connection with the drawings, the simplicity and advantages of my improved egg whip will be readily understood and appreciated, and it will be evident that I have produced an egg whip possessing the necessary essentials of such a device, which accomplishes all the objects herein set forth and is practical in every respect.

I claim:

An egg beater comprising a handle having shouldered and reduced end portions provided with grooves terminating in openings, spring wire loops having straight shanks engaged in the grooves in the handle, the shanks terminating in inturned ends engaged in the openings in the handle, and binding wires encircling the shanks of the loops to secure them to the handle the loops being of gradually increasing size from the center outward, the shorter loops being connected to the end of the handle and the ends of the outer larger loops being brought down over the ends of the shorter loops, there being an independent series of loops independently secured to each of the shouldered end portions of the handle.

In testimony whereof I affix my signature in presence of two witnesses.

FELIX GENGE.

Witnesses:
A. FOLSOM,
C. BORDSEN.